(12) United States Patent
Lee et al.

(10) Patent No.: US 9,047,180 B2
(45) Date of Patent: Jun. 2, 2015

(54) COMPUTING SYSTEM, METHOD AND COMPUTER-READABLE MEDIUM PROCESSING DEBUG INFORMATION IN COMPUTING SYSTEM

(75) Inventors: Jae Don Lee, Paju-si (KR); Shi Hwa Lee, Seoul (KR); Seung Won Lee, Hwaseong-si (KR); Chae Seok Im, Suwon-si (KR); Min Kyu Jeong, Seongnam-sil (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 12/923,869

(22) Filed: Oct. 12, 2010

(65) Prior Publication Data

US 2011/0119656 A1 May 19, 2011

(30) Foreign Application Priority Data

Nov. 13, 2009 (KR) ........................ 10-2009-0109635

(51) Int. Cl.
*G06F 9/44* (2006.01)
*G06F 11/36* (2006.01)
*G06F 11/07* (2006.01)

(52) U.S. Cl.
CPC ........ *G06F 11/0703* (2013.01); *G06F 11/3664* (2013.01); *G06F 11/0736* (2013.01); *G06F 11/366* (2013.01)

(58) Field of Classification Search
CPC ............ G06F 11/3664; G06F 11/3636; G06F 11/3656; G06F 11/0736; G06F 11/0748
USPC ........................................................ 717/128
See application file for complete search history.

(56) References Cited

U.S. PATENT DOCUMENTS

| | | | | |
|---|---|---|---|---|
| 5,371,878 A * | 12/1994 | Coker | ............................. | 703/28 |
| 5,450,586 A * | 9/1995 | Kuzara et al. | ................. | 717/124 |
| 5,600,790 A * | 2/1997 | Barnstijn et al. | ........... | 714/38.12 |
| 6,658,600 B1 * | 12/2003 | Hogdal et al. | ................. | 714/33 |
| 6,738,927 B2 * | 5/2004 | Phillips | ........................... | 714/25 |
| 6,769,076 B1 * | 7/2004 | Moyer et al. | .................... | 714/30 |
| 8,095,914 B1 * | 1/2012 | Singh et al. | ................... | 717/128 |
| 2002/0059560 A1 * | 5/2002 | Phillips | ........................ | 717/124 |
| 2002/0144235 A1 * | 10/2002 | Simmers et al. | .............. | 717/124 |

(Continued)

FOREIGN PATENT DOCUMENTS

| | | |
|---|---|---|
| JP | 2002-351695 | 12/2002 |
| JP | 2005-316646 | 11/2005 |

(Continued)

OTHER PUBLICATIONS

MacNamee et al., "Emerging on-chip debugging techniques for real-time embedded systems," IEEE Computing & Control Engineering Journal, 2000, 8pg.*

(Continued)

*Primary Examiner* — Ryan Coyer
(74) *Attorney, Agent, or Firm* — NSIP Law (57) ABSTRACT

Disclosed are a system, method and computer-readable medium related to processing debug information from an embedded system. Source code of an application program to be used in an embedded system may be compiled by a computing system. The application program may include a debug code line. A minimum amount of debug information is stored in an embedded system, reducing memory overhead and waste of clock cycles of a processor.

14 Claims, 8 Drawing Sheets

(56) References Cited

U.S. PATENT DOCUMENTS

| | | | |
|---|---|---|---|
| 2003/0023956 A1* | 1/2003 | Dulberg et al. | 717/130 |
| 2003/0074650 A1* | 4/2003 | Akgul et al. | 717/129 |
| 2004/0073841 A1* | 4/2004 | Toros et al. | 714/30 |
| 2007/0113218 A1* | 5/2007 | Nolan et al. | 717/124 |
| 2008/0072103 A1* | 3/2008 | Lou | 714/38 |
| 2008/0120604 A1* | 5/2008 | Morris | 717/128 |
| 2009/0204823 A1* | 8/2009 | Giordano et al. | 713/190 |
| 2009/0217105 A1* | 8/2009 | Hsu | 714/45 |
| 2009/0282294 A1* | 11/2009 | Edwards | 714/45 |

FOREIGN PATENT DOCUMENTS

| | | |
|---|---|---|
| JP | 2007-304840 | 11/2007 |
| JP | 2008-269529 | 11/2008 |
| KR | 10-2003-59396 | 7/2003 |
| KR | 10-2004-87767 | 10/2004 |
| KR | 10-2005-33327 | 4/2005 |

OTHER PUBLICATIONS

Whitehouse et al., "Marionette: Using RPC for Interactive Development and Debugging of Wireless Embedded Networks," ACM, 2006, 8pg.*

* cited by examiner

COMPUTING SYSTEM, METHOD AND COMPUTER-READABLE MEDIUM PROCESSING DEBUG INFORMATION IN COMPUTING SYSTEM

CROSS-REFERENCE TO RELATED APPLICATIONS

This application claims the benefit of Korean Patent Application No. 10-2009-0109635, filed on Nov. 13, 2009, in the Korean Intellectual Property Office, the disclosure of which is incorporated herein by reference.

BACKGROUND

1. Field

One or more embodiments of the following description relate to debugging of an application program in a computing system, and more particularly, to a method of processing debug information of an application program for an embedded system.

2. Description of the Related Art

Recently, embedded systems have been utilized in a wide variety of fields, including for example, vehicles, household appliances, medical automatization, sensor networks, Automatic Teller Machines (ATMs), and other fields.

Since an embedded system may have hardware performance limits, for example a lower memory capacity or reduced processor performance, there is a great demand to streamline operations to be performed in real-time in embedded systems.

Debugging is a process of finding errors of a program and analyzing causes of the errors during development of the program. The debugging may also be performed in an application program for the embedded system.

Therefore, there is a demand for studies to efficiently process debug information of an application program for an embedded system, and to efficiently utilize limited resources of the embedded system.

SUMMARY

According to example embodiments, there may be provided a computing system that may efficiently perform debugging of an application program, and a method of processing debug information in the computing system.

According to example embodiments, there also may be provided a computing system that may efficiently process debug information to prevent incurring overhead in an embedded system when an application program for the embedded system is executed in real-time, and a method of processing debug information in the computing system.

The foregoing and/or other aspects are achieved by providing a computing system, including a first memory to store static information corresponding to a debug code line, when source code of an application program containing the debug code line is compiled, and a processing unit to store, in a second memory, debug information corresponding to the debug code line, the second memory located in an embedded system.

The application program may be executed in the embedded system.

The static information may include a message identifier (ID) corresponding to the debug code line, and a string associated with the message ID. The message ID and the string may be stored in the first memory in a table.

The computing system may further include an output unit to read the debug information from the second memory in the embedded system, and to output a debug message based on the read debug information and the static information stored in the first memory, when the debug information is referenced while the application program is executed in the embedded system.

Here, when the computing system is unable to read the debug information directly from the second memory, the output unit of the computing system may receive the debug information from a transmitter in the embedded system, and may output a debug message based on the debug information and the static information stored in the first memory, while the application program is executed in the embedded system.

Additionally, the output unit may periodically receive, from the transmitter, a plurality of pieces of debug information that are referenced when the application program is being executed in the embedded system.

The foregoing and/or other aspects are also achieved by providing a computing system including a first memory to store static information, and a message ID of a debug code line, when an application program of an embedded system is compiled, the application program containing the debug code line, the static information associated with the debug code line, a processing unit to store, in a second memory, dynamic debug information corresponding to the debug code line, the second memory located in the embedded system, and an output unit to receive a current value of the dynamic debug information from the embedded system, to combine the current value with the static information, and to output debug information corresponding to the debug code line, when the application program is being executed in the embedded system.

When the application program is executed in the embedded system, the output unit may read the current value of the dynamic debug information directly from the second memory in the embedded system, may combine the received current value with the static information, and may output the debug information corresponding to the debug code line.

Here, when the output unit is unable to read the current value of the dynamic debug information directly from the second memory, the output unit may periodically receive the current value of the dynamic debug information from a transmitter in the embedded system, while the application program is executed in the embedded system.

The message ID of the debug code line, and the static information associated with the debug code line may be stored in the first memory in a table.

The foregoing and/or other aspects are also achieved by providing a method of processing debug information in a computing system, the method including storing, in a first memory, static information corresponding to a debug code line, when a source code of an application program containing the debug code line is compiled, the first memory located in a host computing system, and storing, in a second memory, debug information corresponding to the debug code line, the second memory being located in an embedded system.

Therefore, debugging of an application program for an embedded system may be efficiently performed.

Additionally, an overhead may be prevented in an embedded system when an application program for the embedded system is executed in real-time, and thus, it is possible to efficiently process debug information.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout. Embodiments are described below to explain the present disclosure by referring to the figures.

Figure 1:
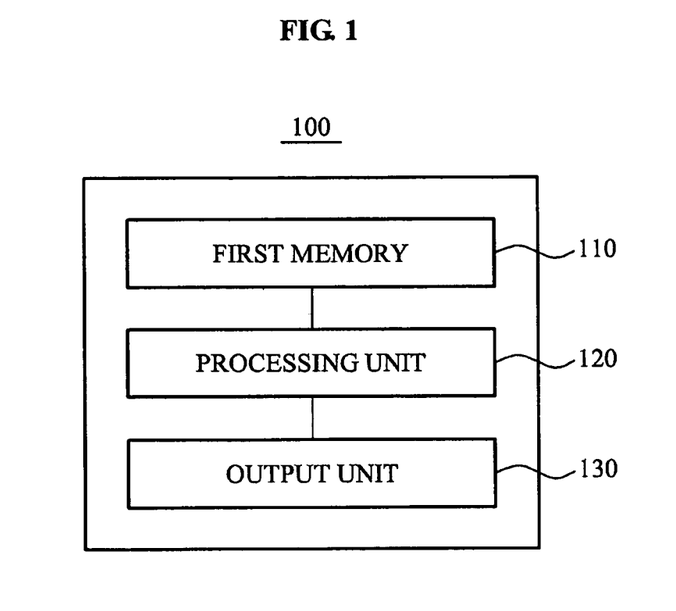
FIG. 1 illustrates a block diagram of a computing system according to example embodiments.

FIG. 1 illustrates a block diagram of a computing system 100 according to example embodiments.

The computing system 100 may function as a host for an embedded system. The computing system 100 may have a higher performing processor and a larger memory capacity, than the embedded system. In other words, the computing system 100 may have better performing hardware than the embedded system.

Additionally, during compiling of source code of an application program to be used in the embedded system, a debug code line may be inserted into the source code.

The debug code line may determine whether code lines placed in front of the debug code line operate normally. Typically, in source code of an application program to be used in an embedded system based on C language or assembly language, the debug code line may utilize, for example, a printf( ) function.

However, at least 30000 clock cycles may generally be consumed to execute the printf( ) function, and a large amount of memory may be consumed to store a string used to process the debug code line, which may cause problems in the embedded system having the above described limited resources.

For example, when the application program is to be executed in real-time in the embedded system, the embedded system may malfunction due to an overhead caused by processing of printf( ).

To solve the above problems, conventional embedded systems may restrict functions of printf( ), and may receive a parameter to remove a function of forming a string or to limit a number of parameters to one or two.

When the computing system 100 functioning as a host for the embedded system compiles the source code of the application program containing the debug code line, only dynamic debug information to be processed in real-time may be stored in the embedded system, and a static string may be directly stored in the computing system 100.

When the application program is currently being executed in the embedded system, a current value of the dynamic debug information may be transferred to the computing system 100, and the computing system 100 may output a debug string, based on the received current value of the dynamic debug information and the static string that is stored in advance in the computing system 100.

In other words, the static string that remains unchanged during execution of the application program may be stored in advance in the computing system 100, and thus, a memory overhead may be prevented from being incurred in the embedded system. Additionally, the computing system 100 may perform, for example, a combining operation to obtain the debug string, and thus, it is possible to minimize a waste of clock cycles in the embedded system.

Therefore, a probability that the embedded system fails to perform a real-time operation may be significantly reduced.

Hereinafter, the above operations will be further described with reference to components of the computing system 100.

The computing system 100 may compile source code of an application program to be executed in an embedded system 400 that will be described below with reference to FIG. 4.

The application program may include at least one debug code line. A structure of the debug code line will be further described with reference to FIG. 2 below.

The debug code line may be used to perform debugging of the source code of the application program, and may use a printf( ) function to print a predetermined string. However, the debug code line is merely an example, and should not be interpreted as limiting the example embodiments. Accordingly, it will be understood that any code line available for debugging may not depart from the spirit and scope of the example embodiments, regardless of a type or modified form of a function.

Additionally, when the debug code line is compiled, a message identifier (ID) used to identify the debug code line, and a static string that remains unchanged during execution of the application program may be stored in a first memory 110 located in the computing system 100.

The message ID and the static string stored in the first memory 110 will be further described with reference to FIG. 3 below.

Referring to FIG. 1, a processing unit 120 may store dynamic debug information in a second memory located in the embedded system. Here, a value of the dynamic debug information may be stored during the execution of the application program.

For example, when the dynamic debug information is referenced while the application program is executed in the embedded system, a current value corresponding to the dynamic debug information may be transferred to an output unit 130 of the computing system 100.

In this example, when the computing system 100 is able to directly access the second memory in the embedded system, the output unit 130 may read the current value corresponding to the dynamic debug information. Otherwise, when the computing system 100 is unable to directly access the second memory, a transmitter 420 in the embedded system may transmit the current value corresponding to the dynamic debug information to the output unit 130. Here, the transmitter may periodically perform the transmitting.

The above operations will be further described with reference to FIGS. 4 through 6 below.

The output unit 130 may output a debug string based on the dynamic debug information and the static debug string. Here, the dynamic debug information and the static debug string may be identified by the message ID.

Figure 2:
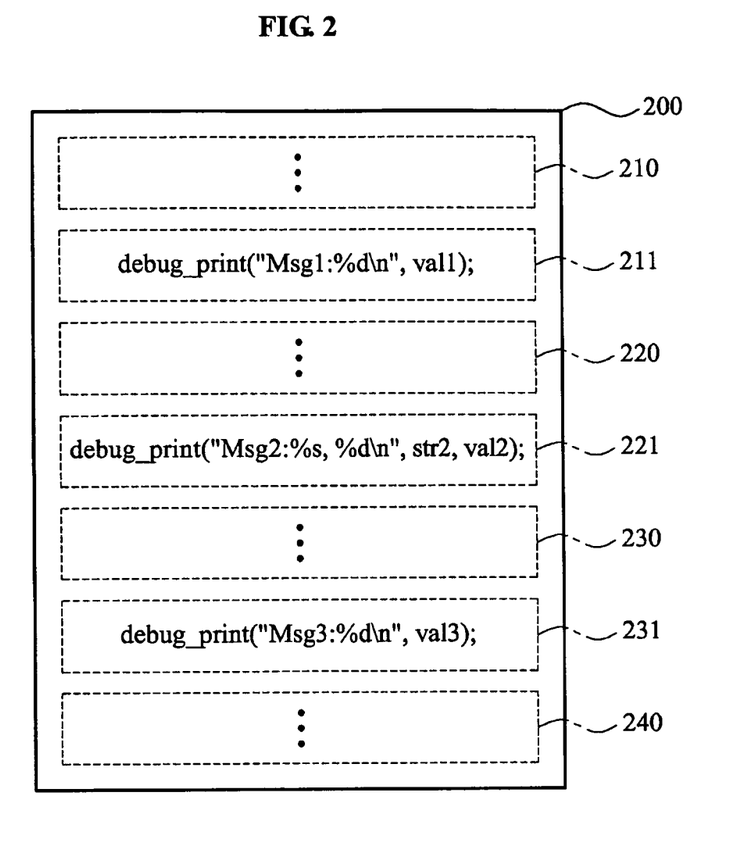
FIG. 2 illustrates a diagram of source code, contained an application program including a debug code line and which is compiled by a computing system according to example embodiments.

FIG. 2 illustrates source code 200 of an application program containing a debug code line. The source code 200 may be compiled by the computing system 100 of FIG. 1.

The source code 200 may typically include application execution code lines 210, 220, 230, and 240 each of which may include at least one line of application execution code, and debug code lines 211, 221, and 231. The debug code lines 211, 221, and 231 may be respectively placed between the code lines 210 and 220, between the code lines 220 and 230, and between code lines 230 and 240.

As described above, the debug code lines 211, 221, and 231 may use the printf() function to output a value of a predetermined parameter.

The debug code line 211 may indicate that a value of an integer parameter "val1" may be output with "Msg1:". When a string corresponding to the debug code line 211 is output, no bugs are found in code lines placed in front of the debug code line 211.

The debug code line 221 may indicate that a value of a character parameter "str2" and a value of an integer parameter "val2" may be output with"Msg2:". When a string corresponding to the debug code line 221 is output, no bugs are found in code lines placed in front of the debug code line 221.

Likewise, the debug code line 231 may indicate that a value of an integer parameter "val3" may be output with "Msg3:". When a string corresponding to the debug code line 231 is output, no bugs are found in code lines placed in front of the debug code line 231.

Figure 3:
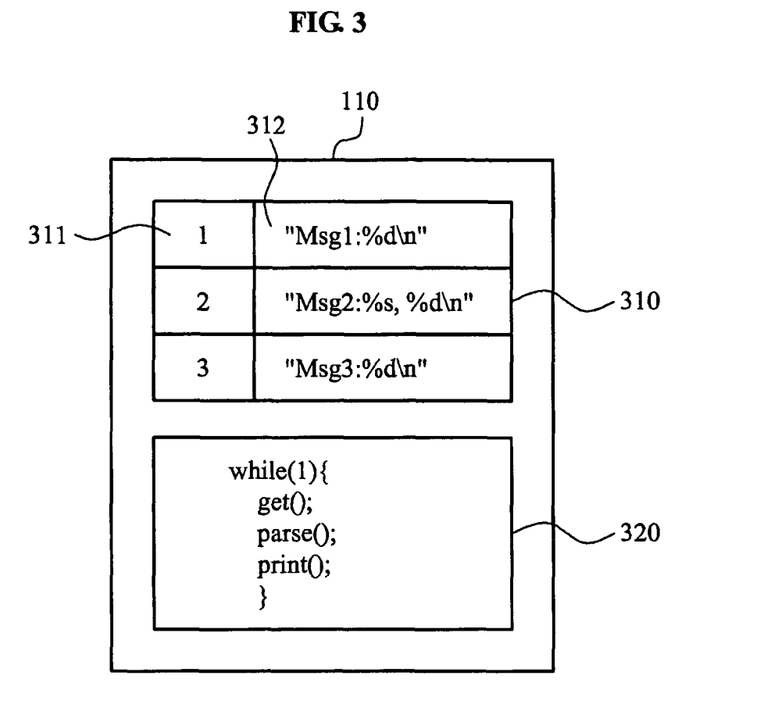
FIG. 3 illustrates a diagram of string information, which is generated and stored in a first memory in the computing system of FIG. 1 when the source code of FIG. 2 is compiled according to example embodiments.

FIG. 3 illustrates string information 310, which is generated and stored in the first memory 110 of the computing system 100, when the source code 200 is compiled.

When a debug code line is compiled, debug strings may be generated, and the generated debug strings may be stored and managed in the first memory 110 in a table.

Each of the debug strings may be identified by a message ID. For example, a static string 312 with a message ID of "1" may be identified by a message ID portion 311 of the string information 310.

In the embodiments, static strings, for example the static string 312, are stored in advance in the computing system 100, and thus, a memory overhead of the embedded system may be greatly reduced, compared with conventional compiled source code of an application program for a conventional embedded system.

Additionally, as described above with reference to FIG. 1, when a current value of each piece of dynamic debug information is transmitted while the application program is executed in the embedded system, the output unit 130 of the computing system 100 may output a debug string using debug string output code 320, shown, for example, as pseudocode in FIG. 3.

Figure 4:
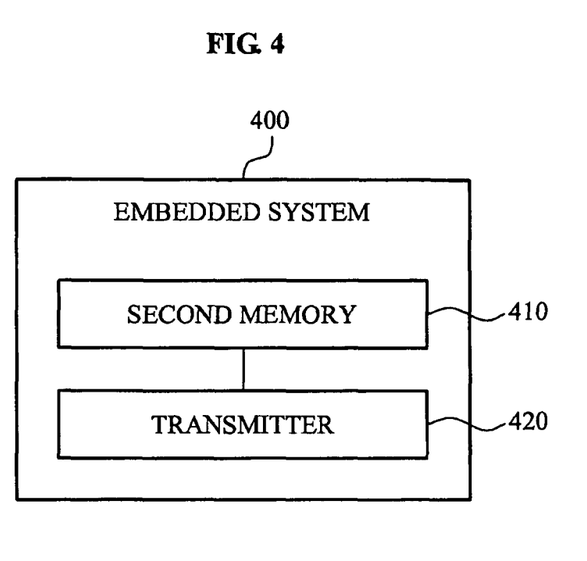
FIG. 4 conceptually illustrates a block diagram of an embedded system which executes the application program of FIG. 2 compiled by the computing system of FIG. 1 according to example embodiments.

FIG. 4 conceptually illustrates an embedded system 400 which executes the application program of FIG. 2 compiled by the computing system 100 of FIG. 1.

As described above, when the source code 200 is compiled by the computing system 100, the processing unit 120 may store, in a second memory 410, dynamic debug information corresponding to a debug code line. The second memory 410 may be located in the embedded system 400.

The dynamic debug information may be identified by a message ID, which will be further described with reference to FIG. 5 below.

When the application program is being executed, a transmitter 420 in the embedded system 400 may periodically transmit a current value of the dynamic debug information to the output unit 130 of the computing system 100. However, when the output unit 130 is able to directly access the second memory 410 as described above, the transmitter 420 may not be needed and may be omitted.

Figure 5:
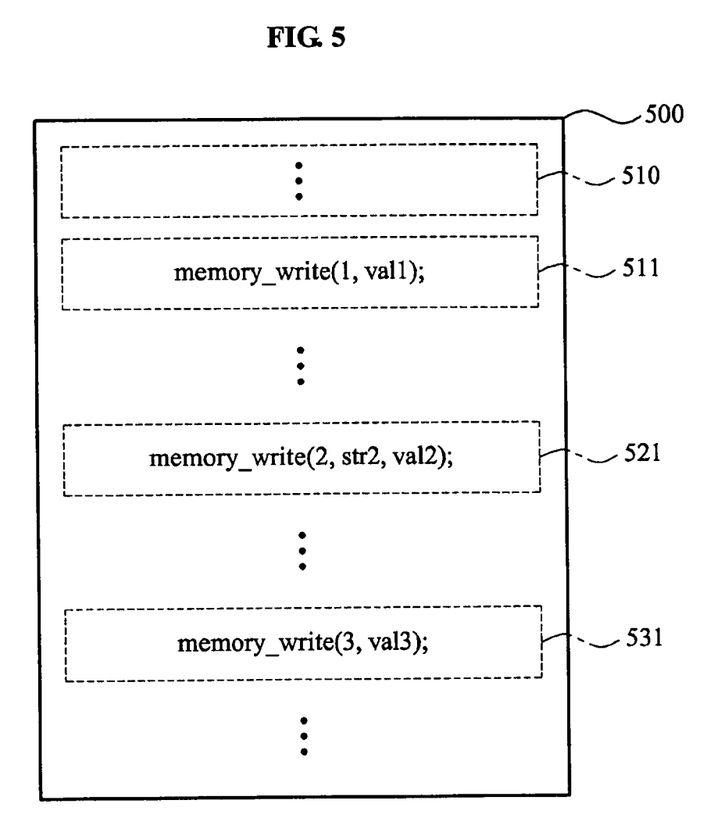
FIG. 5 illustrates a diagram of an instruction to store dynamic debug information in a second memory of the embedded system of FIG. 4 when the source code of FIG. 2 is compiled according to example embodiments.

FIG. 5 illustrates an example of an instruction to store dynamic debug information in the second memory 410 of the embedded system 400, when the source code 200 of FIG. 2 is compiled.

When the source code 200 is compiled, the code lines 210, 220, 230, and 240 shown in FIG. 2 may be compiled into machine code, and an instruction for the code lines 210, 220, 230, and 240 may correspond to an instruction 510.

An instruction 511 corresponding to the debug code line 211 of FIG. 2 may be used to store "val1" identified by a message ID of "1" in the second memory 410 of the embedded system 400.

An instruction 521 corresponding to the debug code line 221 of FIG. 2 may be used to store "str2" and "val2" identified by a message ID of "2" in the second memory 410 of the embedded system 400.

Likewise, an instruction 531 corresponding to the debug code line 231 of FIG. 2 may be used to store "val3" identified by a message ID of "3" in the second memory 410 of the embedded system 400.

Figure 6:
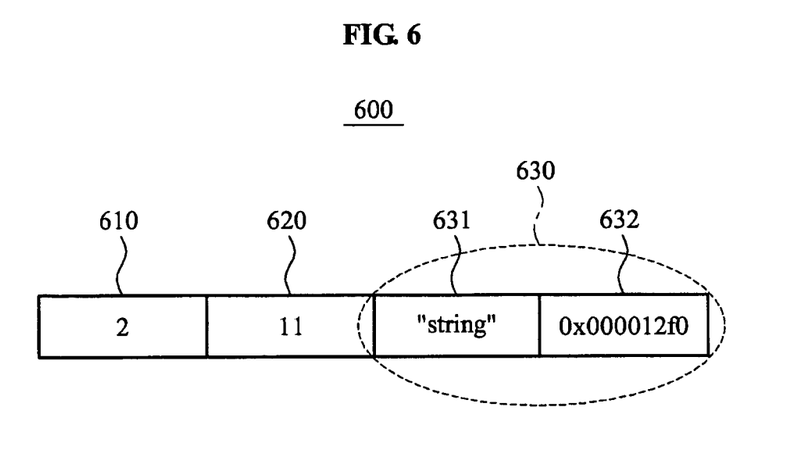
FIG. 6 illustrates a diagram of information transferred from the embedded system of FIG. 4 to the computing system of FIG. 1 when the embedded system of FIG. 4 executes the application program of FIG. 2 according to example embodiments.

FIG. 6 illustrates a current value 600 of dynamic debug information, which is transferred from the embedded system 400 to the computing system 100 when the embedded system 400 executes the application program of FIG. 2.

In FIG. 6, data 610 may correspond to a value of a message ID, and data 620 may correspond to a size of the current value 600, for example, in bytes. Additionally, current value data 630 may include data 631 and data 632 that respectively correspond to a current value of "str2", and a current value of "val2".

When a debug code line with a message ID of "2" is executed, the transmitter 420 of the embedded system 400 may transfer the current value 600 of the dynamic debug information to the output unit 130 of the computing system 100, or the output unit 130 may read the current value 600 directly from the second memory 410.

Additionally, the pieces of data 620, 631, and 632 may be combined with a string with a message ID of "2" shown in FIG. 3, and the debug string output code 320 may be executed, so that a debug string may be output.

In other words, waste of clock cycles in outputting debug strings is reduced, and therefore, a probability that the embedded system 400 fails to perform a real-time operation may be significantly reduced.

Figure 7:
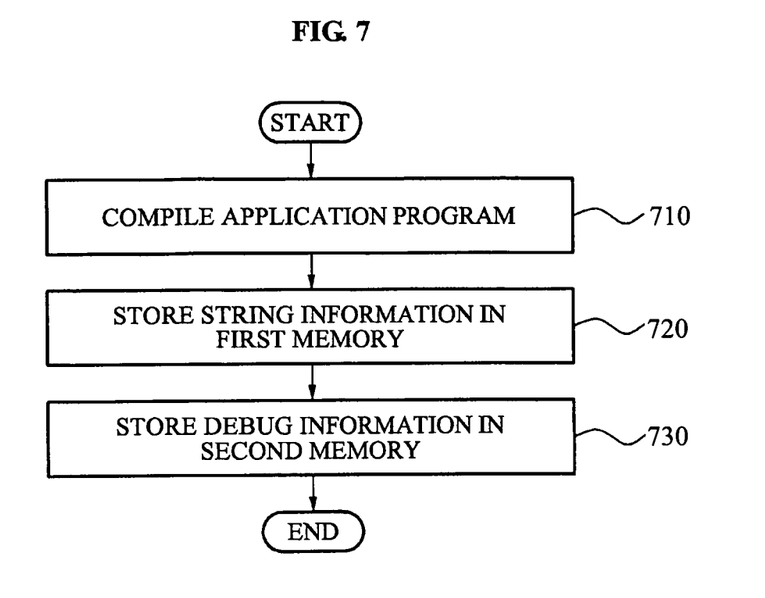
FIG. 7 illustrates a flowchart of a method of processing debug information in a computing system according to example embodiments.

FIG. 7 illustrates a flowchart of a method of processing debug information in the computing system 100.

In operation 710, the source code 200 of the application program shown in FIG. 2 may be compiled. In operation 720, static debug strings corresponding to the debug code line may be stored in the first memory 110 of the computing system 100. As described above, the debug code line may be contained in the source code of the application program, and the computing system 100 may function as a host for the embedded system 400.

In operation 730, the dynamic debug information may be stored in the second memory 410 of the embedded system 400.

Operations 710 through 730 have been described above with reference to FIGS. 1 through 3 and thus, descriptions thereof will be omitted herein.

Figure 8:
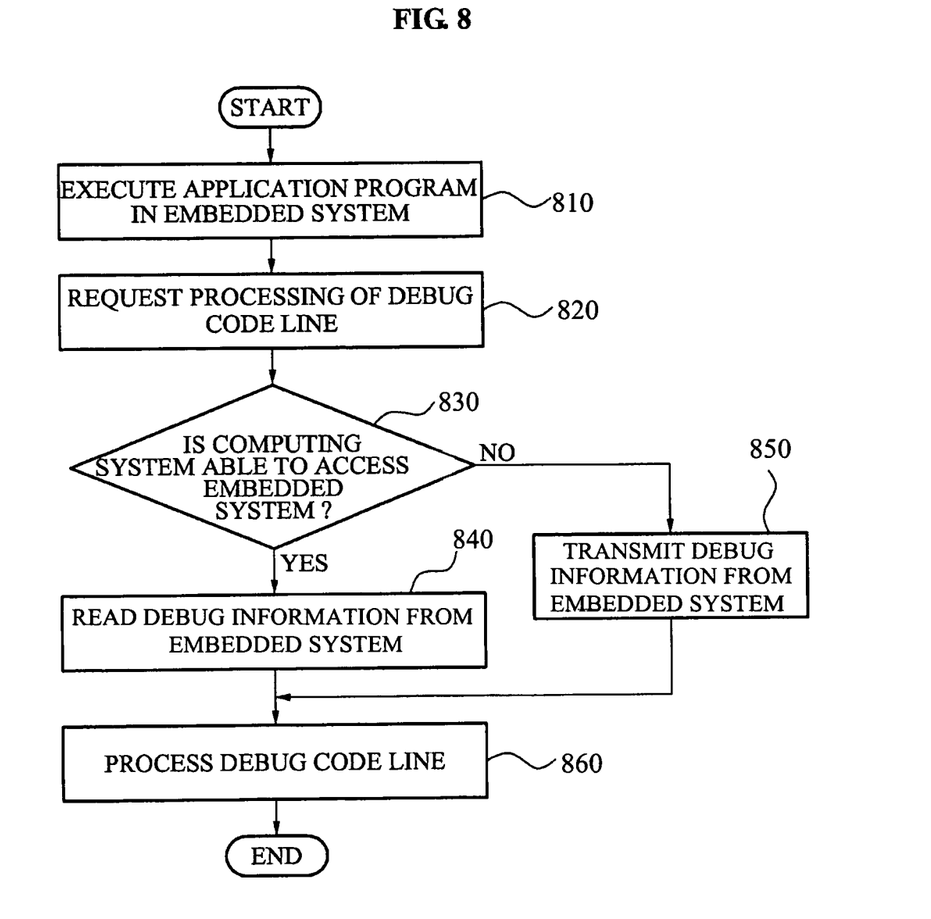
FIG. 8 illustrates a flowchart of another method of processing debug information in a computing system according to example embodiments.

FIG. 8 illustrates a flowchart of an example method of processing debug information in the computing system 100.

In operation 810, an application program may be executed in the embedded system 400.

In operation 820, a request to process a debug code line may be received during execution of the application program. In operation 830, it is determined whether the computing system 100 is able to directly access the embedded system 400.

Specifically, when the computing system 100 is able to directly access the second memory 410 of the embedded system 400, the output unit 130 of the computing system 100 may read a current value of dynamic debug information from the second memory 410 in operation 840.

Alternatively, when the computing system 100 is unable to directly access the second memory 410, the transmitter 420 of the embedded system 400 may periodically transmit the current value of dynamic debug information to the output unit 130 of the computing system 100 in operation 850.

In operation 860, the output unit 130 may output a string of the debug code line.

The operations 810 through 860 have been described above with reference to FIGS. 4 through 6.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A computing apparatus, comprising:
a first memory located in the computing apparatus, and configured to store static portions of debug information corresponding to a debug code line, in response to a source code of an application program containing the debug code line being compiled by the computing apparatus, the static portions of the debug information comprising a message identifier (ID) that identifies the debug code line, and a string that is output in response to no bugs being found in code lines placed in front of the debug code line; and
a processing unit configured to store, in a second memory located in an embedded apparatus, dynamic portions of the debug information corresponding to the debug code line, in response to the debug code line being executed by the embedded apparatus.

2. The computing apparatus of claim 1, wherein the application program is executed by the embedded apparatus.

3. The computing apparatus of claim 1, wherein the message ID and the string are stored in the first memory in a table.

4. The computing apparatus of claim 1, further comprising:
an output unit configured to read the dynamic portions of the debug information from the second memory in the embedded apparatus, and output a debug message based on the read dynamic portions of the debug information and the static portions of the debug information stored in the first memory, in response to the dynamic portions of the debug information being referenced while the application program is executed by the embedded apparatus.

5. The computing apparatus of claim 1, further comprising:
an output unit configured to output a debug message based on the dynamic portions of the debug information and the static portions of the debug information stored in the first memory, in response to the dynamic portions of the debug information being received from a transmitter in the embedded apparatus while the application program is executed by the embedded apparatus.

6. The computing apparatus of claim 5, wherein the output unit is configured to:
periodically receive, from the transmitter, a plurality of pieces of the dynamic portions of the debug information, the plurality of pieces of the dynamic portions of the debug information being referenced in response to the application program being executed by the embedded apparatus.

7. A computing apparatus, comprising:
a first memory located in the computing apparatus, and configured to store static portions of debug information corresponding to a debug code line, in response to a source code of an application program containing the debug code line being compiled by the computing apparatus, the static portions of the debug information comprising a message identifier (ID) that identifies the debug code line. and a string that is output in response to no bugs being found in code lines placed in front of the debug code line;

a processing unit configured to store, in a second memory located in an embedded apparatus, dynamic portions of the debug information corresponding to the debug code line, in response to the debug code line being executed by the embedded apparatus; and an output unit configured to receive a current value of the dynamic portions of the debug information from the embedded apparatus, combine the current value with the static portions of the debug information, and output the combined debug information corresponding to the debug code line, in response to the application program being executed by the embedded.

8. The computing apparatus of claim 7, wherein the output unit is configured to:

periodically receive the current value of the dynamic portions of the debug information from a transmitter of the embedded apparatus, in response to the application program being executed in the embedded apparatus.

9. The computing apparatus of claim 7, wherein the message ID and the static string are stored in the first memory in a table.

10. A method of processing debug information in a computing apparatus, the method comprising:

storing, in a first memory located in the computing apparatus, static portions of debug information corresponding to a debug code line, in response to a source code of an application program containing the debug code line being compiled by the computing apparatus, the static portions of the debug information comprising a message identifier (ID) that identifies the debug code line, and a string that is output in response to no bugs being found in code lines placed in front of the debug code line; and storing, in a second memory located in an embedded apparatus, dynamic portions of the debug information corresponding to the debug code line, in response to the debug code line being executed by the embedded apparatus.

11. The method of claim 10, wherein the message ID and the static string are stored in the first memory in a table.

12. The method of claim 10, further comprising:

reading, by the computing apparatus, the dynamic portions of the debug information from the second memory in the embedded apparatus, and outputting a debug message based on the read dynamic portions of the debug information and the static portions of the debug information stored in the first memory, in response to the dynamic portions of the debug information being referenced while the application program is executed by the embedded apparatus.

13. The method of claim 10, further comprising:

outputting, by the host computing apparatus, a debug message based on the dynamic portions of the debug information and the static portions of the debug information stored in the first memory, in response to the dynamic portions of the debug information being received from a transmitter in the embedded apparatus while the application program is executed by the embedded apparatus.

14. At least one non-transitory computer readable recording medium comprising computer readable instructions that control at least one processor to implement the method of claim 10.

* * * * *